[12] United States Patent
Nagai et al.

(10) Patent No.: US 8,376,339 B2
(45) Date of Patent: Feb. 19, 2013

(54) POSITIONER

(75) Inventors: Takashi Nagai, Hyogo (JP); Wataru Takahashi, Osaka (JP); Takayasu Ohara, Osaka (JP); Seiji Iwai, Hyogo (JP)

(73) Assignee: Panasonic Corporation, Osaka (JP)

( * ) Notice: Subject to any disclaimer, the term of this patent is extended or adjusted under 35 U.S.C. 154(b) by 67 days.

(21) Appl. No.: 12/678,385

(22) PCT Filed: Jul. 8, 2009

(86) PCT No.: PCT/JP2009/003177
§ 371 (c)(1),
(2), (4) Date: Mar. 16, 2010

(87) PCT Pub. No.: WO2010/029670
PCT Pub. Date: Mar. 18, 2010

(65) Prior Publication Data
US 2011/0163490 A1 Jul. 7, 2011

(30) Foreign Application Priority Data
Sep. 12, 2008 (JP) .................. 2008-234689

(51) Int. Cl.
B23Q 1/25 (2006.01)
B23Q 1/64 (2006.01)
B23Q 3/18 (2006.01)
B25B 11/00 (2006.01)
H01B 7/06 (2006.01)

(52) U.S. Cl. ............ 269/57; 269/61; 269/55; 269/21; 174/69

(58) Field of Classification Search .......... 269/71, 269/61, 74, 289 R, 900, 903, 21, 32; 74/606 R, 74/813 R, 840
See application file for complete search history.

(56) References Cited

U.S. PATENT DOCUMENTS
2009/0200722 A1* 8/2009 Nakano et al. ............... 269/61

FOREIGN PATENT DOCUMENTS
| JP | 62-1892 | | 1/1987 |
| JP | 4-29329 | | 3/1992 |
| JP | 5-88842 | | 12/1993 |
| JP | 2000-107966 | A | 4/2000 |
| JP | 2002-273630 | A | 9/2002 |
| JP | 2005-119012 | * | 5/2005 |
| JP | 2006-296046 | A | 10/2006 |

(Continued)

OTHER PUBLICATIONS
International Search Report for International Application No. PCT/JP2009/003177, Sep. 29, 2009, Panasonic Corporation.

*Primary Examiner* — Monica Carter
*Assistant Examiner* — Seahee Yoon
(74) *Attorney, Agent, or Firm* — RatnerPrestia

(57) ABSTRACT

A positioner includes a housing, a table, a drive portion, a cylinder, a first winder, and a first cord. The cylinder includes a first opening at the rotation center of the table, and a second opening opposite and connected to the first opening. The first winder is disposed outside the second opening of the cylinder. The first cord includes a first lead-out portion and a first wound portion. The first lead-out portion enters the second opening, passes through the cylinder, and is led out from the table. The first wound portion is wound around the first winder according to the rotation of the table. Thus, the positioner can increase the number of air tubes or wires led out onto the table without increasing its size.

16 Claims, 17 Drawing Sheets

FOREIGN PATENT DOCUMENTS

| | | |
|---|---|---|
| JP | 2007-229904 A | 9/2007 |
| JP | 2007-229904 A | 9/2007 |
| JP | 2001-107588 | 4/2011 |
| WO | WO 2006/001146 A1 | 1/2006 |

\* cited by examiner

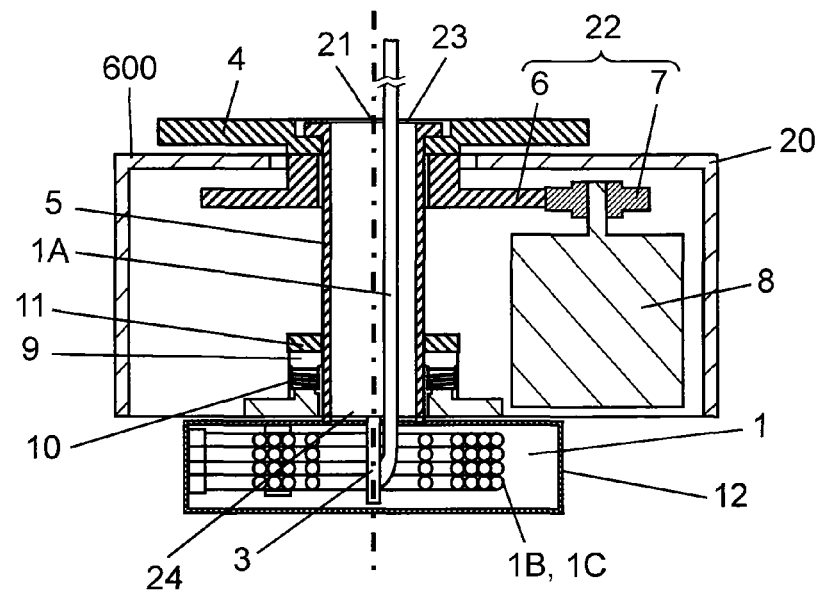
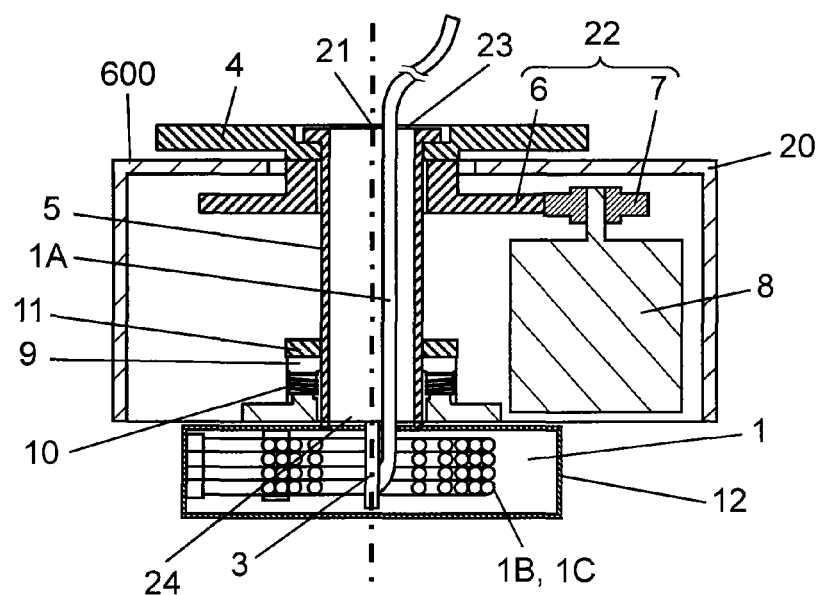

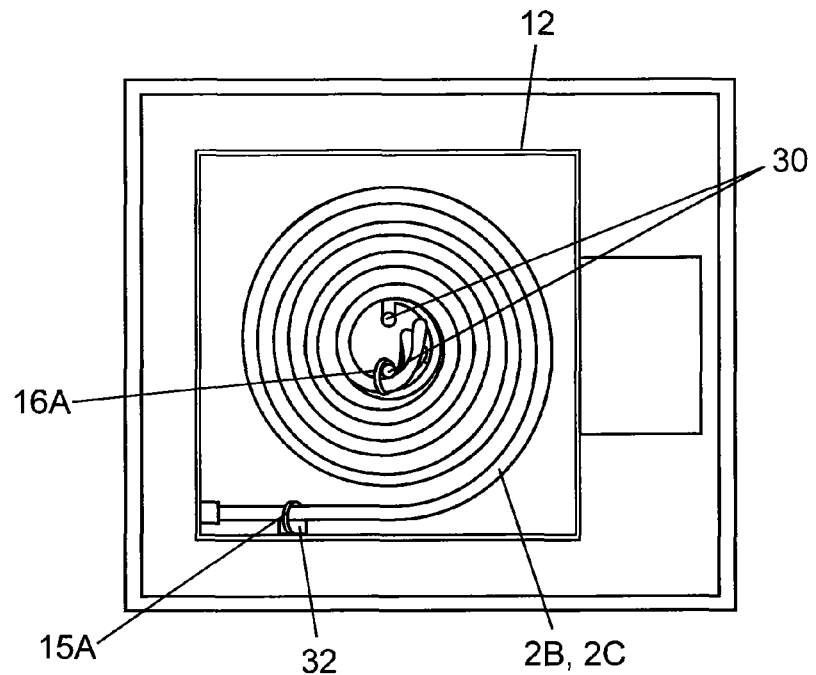
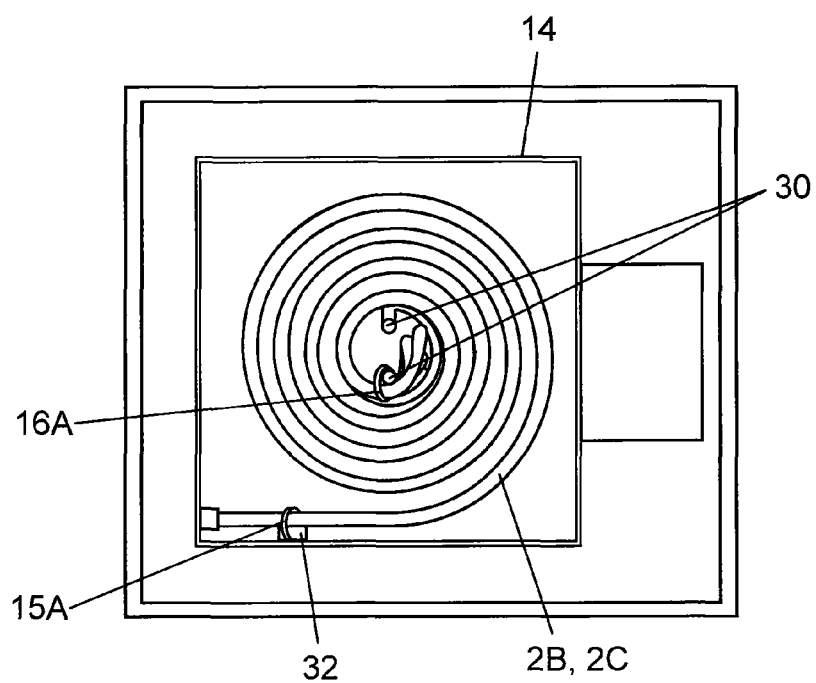

POSITIONER

THIS APPLICATION IS A U.S. NATIONAL PHASE APPLICATION OF PCT INTERNATIONAL APPLICATION PCT/JP2009/003177.

TECHNICAL FIELD

The present invention relates to a positioner used for changing the direction of a workpiece placed on its rotary table so as to facilitate processing such as welding or cutting using an industrial robot.

BACKGROUND ART

As shown in FIG. 16, a conventional positioner includes housing 500. Housing 500 includes drive portion 501 connected to reduction gear 502, and cylinder 503 connected to reduction gear 502A. Cylinder 503, which is driven by drive portion 501 through reduction gears 502 and 502A, is connected at one end to table 504 in such a manner that its center 503A coincides with rotation center 504A of table 504. Cylinder 503 contains composite curl cord 505, which is composed of, for example, an air tube, an I/O signal cable, a power supply cable, and a communication mobile cable (hereinafter referred to as "wires and pipes") banded in parallel. Composite curl cord 505 forms coiled portion 506 inside cylinder 503.

In the positioner having the above-described structure, a workpiece is placed on table 504. Composite curl cord 505 is connected to a processing device for processing the workpiece, so that electrical signals or air can be supplied to the processing device from outside the positioner (see, for example, Patent Literature 1).

Processing a workpiece using such a conventional positioner requires supplying a large number of electrical signals or air to the processing device.

The conventional positioner, however, has the following matters to consider when the large number of electrical signals or air is supplied by increasing the number of composite curl cords 505.

That is, increasing the number of composite curl cords 505 increases the size of coiled portion 506, thus requiring increasing the inner diameter of cylinder 503 through which composite curl cords 505 are passed. The increased inner diameter of cylinder 503 requires an increase in the install size of reduction gear 502A connected to cylinder 503, thus making the overall sizes of cylinder 503 and reduction gear 502A larger. As a result, housing 500 for housing them is increased in size, and hence, the positioner is increased in size.

Or, in the conventional positioner, when composite curl cord 505 having the large number of wires and pipes is provided on table 504, the number of wires and pipes composing composite curl cord 505, which passes through the inside of cylinder 503, is increased. This leads to an increase in the height (11 in FIG. 16) of the coiled portion 506 of composite curl cord 505 formed inside cylinder 503, requiring cylinder 503 to have a larger height. As a result, the positioner is increased in height.

CITATION LIST

Patent Literature

Patent Literature 1: WO2006/001146

SUMMARY OF THE INVENTION

The positioner according to the present invention includes a housing, a table, a drive portion, a cylinder, a first winder, and a first cord.

The table rotates around the rotation center with respect to the housing. The drive portion rotates the table around the rotation center in the forward and reverse directions. The cylinder includes a first opening at the rotation center of the table, and a second opening opposite and connected to the first opening. The first winder is disposed outside the second opening of the cylinder. The first cord includes a first lead-out portion and a first wound portion. The first lead-out portion enters the second opening, passes through the cylinder, and is led out from the table. The first wound portion is wound around the first winder according to the rotation of the table.

In the positioner thus structured, the first wound portion for adjusting the length of the first cord led out onto the table is disposed outside the cylinder. As a result, the positioner can increase the number of the first cords led out onto the table without increasing its size.

BRIEF DESCRIPTION OF THE DRAWINGS

FIG. 7A is another sectional view of the essential part of the positioner according to the first exemplary embodiment of the present invention.

FIG. 7B is another sectional view of the essential part of the positioner according to the first exemplary embodiment of the present invention.

FIG. 13 is a bottom view of the essential part of the positioner according to the second exemplary embodiment of the present invention.

FIG. 14 is a bottom view of the essential part of the other positioner according to the second exemplary embodiment of the present invention.

DETAILED DESCRIPTION OF PREFERRED EMBODIMENTS

Figure 1:
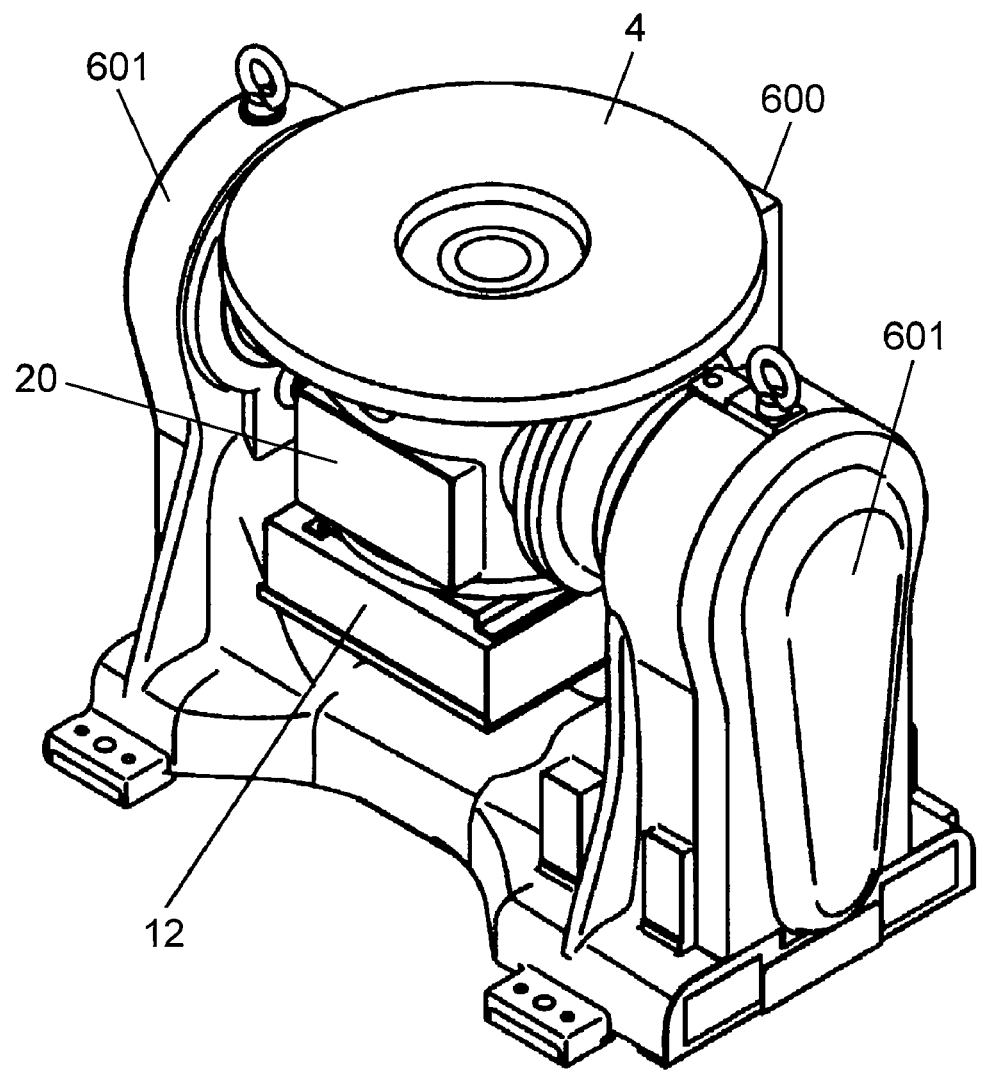
FIG. 1 is a perspective view of a positioner according to a first exemplary embodiment of the present invention.

Exemplary embodiments of the present invention will be described as follows with reference to drawings. Note that the present invention is not limited to the following description illustrating one example of the present invention.
First Exemplary Embodiment FIG. 1 is an external view of a positioner according to a first exemplary embodiment of the present invention. In the drawing, positioner 600 includes table 4, housing 20, and case 12 as a first case. Positioner 600 is supported by two legs 601.

Positioner 600 will be described in detail with reference to FIG. 2A, in which conductive table 4 is disposed above housing 20 in such a manner as to rotate around rotation center 21 with respect to housing 20. Table 4 has electrical conductivity. A workpiece to be welded is placed on and fixed to table 4 by jigs and other tools which are fixed on table 4. Motor 8, which works as a drive portion, rotates table 4 around rotation center 21 in the forward and reverse directions. In the first exemplary embodiment, positioner 600 includes reduction gear 22 for transmitting the power of motor 8 to table 4. Reduction gear 22 includes first gear 6 and second gear 7. First gear 6 is connected to table 4, and second gear 7 transmits the power of motor 8 to table 4 via first gear 6.

Cylinder 5 is connected to table 4. Cylinder 5 includes opening 23 as a first opening and opening 24 as a second opening. Opening 23 has its center 5A at rotation center 21 of table 4. Opening 24 is opposite and connected to opening 23. Cylinder 5 rotates together with table 4 around rotation center 21 with respect to housing 20. Cylinder 5 has fastener 3 as a first winder outside opening 24. Similar to cylinder 5, fastener 3 rotates together with table 4.

Curl cable 1 as a first cord wound around fastener 3. Curl cable 1 includes first lead-out portion 1A and first wound portion 1B. First lead-out portion 1A enters opening 24, passes through cylinder 5, and is led out from table 4. First wound portion 1B is wound around fastener 3 so as to form first reel portion 1C. First reel portion 1C changes its diameter φ5 as table 4 rotates. First lead-out portion 1A corresponds to the portion of curl cable 1 excluding first wound portion 1B.

Figure 3:
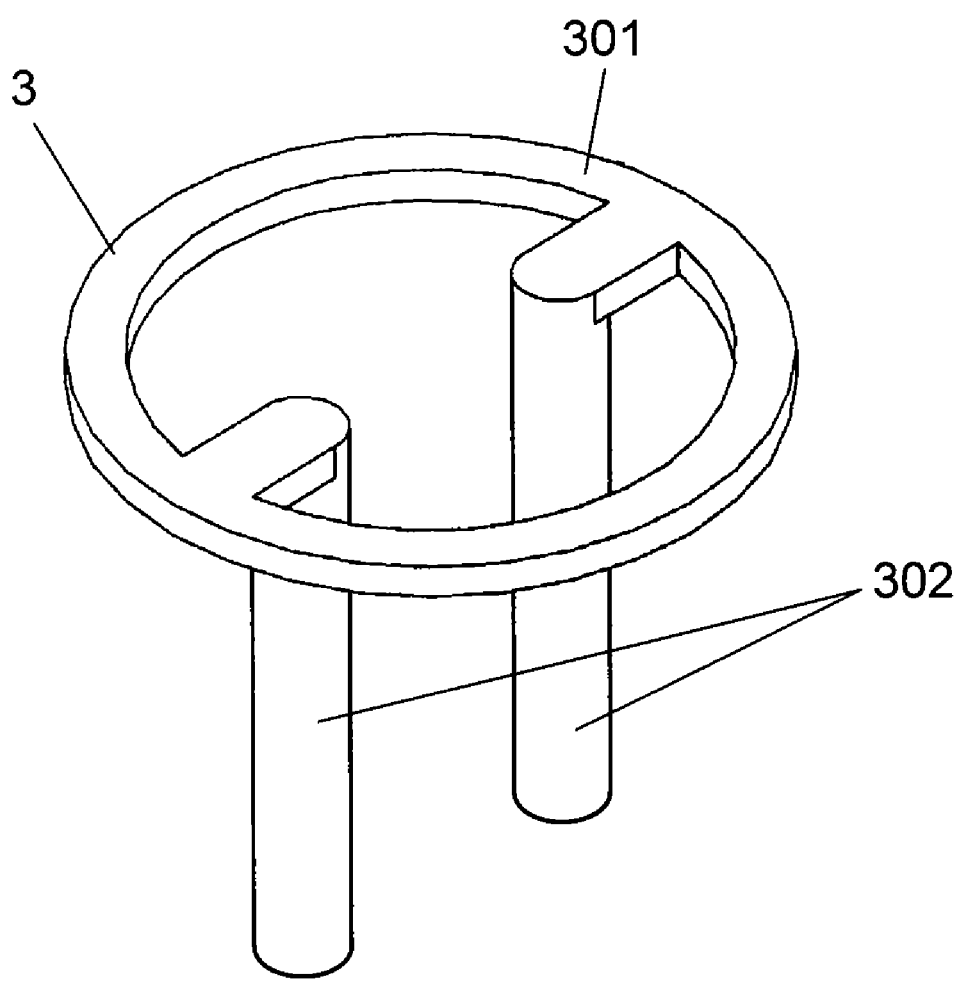
FIG. 3 is a perspective view of a fastener according to the first exemplary embodiment of the present invention.

The positioner according to the present first exemplary embodiment will be described in detail with reference to FIGS. 3 to 5. As shown in FIG. 3, fastener 3 includes fixed plate 301, and fixed shafts 302 as a first winder shaft. In the present first exemplary embodiment, fastener 3 includes two fixed shafts 302. Fixed plate 301 is attached to opening 24. Fixed plate 301 can be attached to opening 24 detachably by using bolts. Fixed shafts 302 are wound with first wound portion 1B. First wound portion 1B is fixed at one end to either one of fixed shafts 302 by a banding band.

Figure 4:
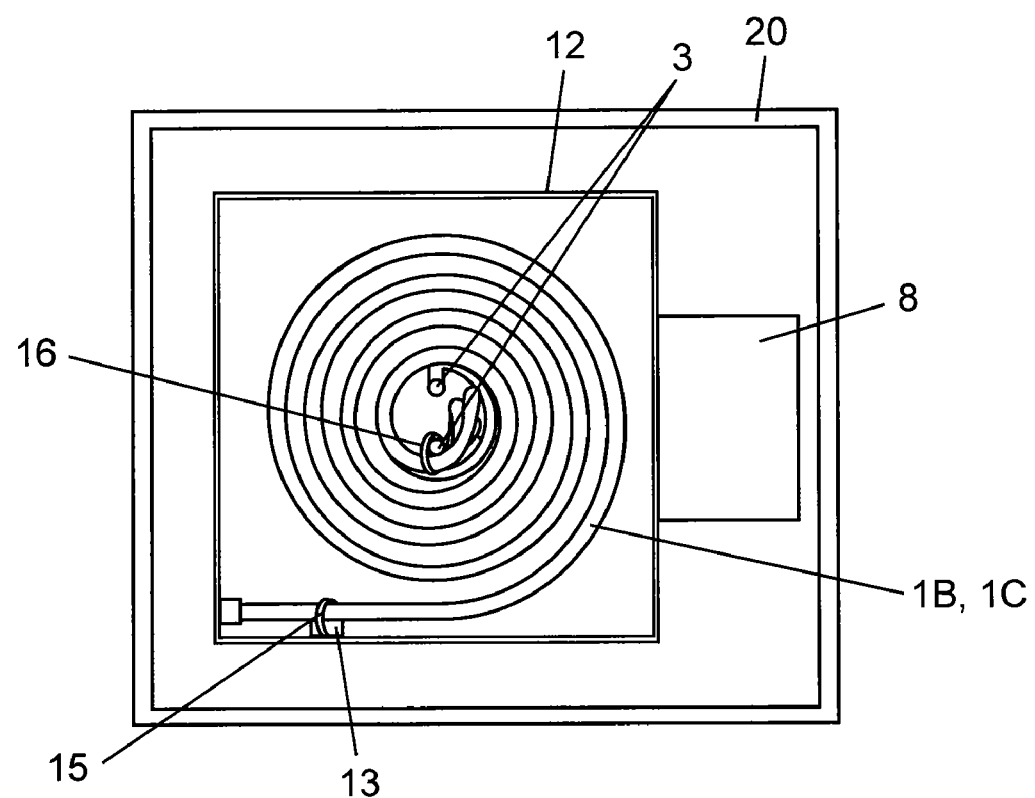
FIG. 4 is a bottom view of the essential part of the positioner according to the first exemplary embodiment of the present invention.

As shown in FIG. 4, first wound portion 1B is housed in case 12. In the present first exemplary embodiment, first reel portion 1C formed by first wound portion 1B forms a spiral around fastener 3 and is housed in case 12. Installation portion 13 is provided in case 12. In the present first exemplary embodiment, installation portion 13 is disposed on an inner wall surface of case 12 in such a manner as to form a projection projecting toward the inside of case 12. First wound portion 1B is fixed to installation portion 13 at one end by banding band 15, and to fastener 3 at the other end by banding band 16, which is a first holder.

Figure 2A:
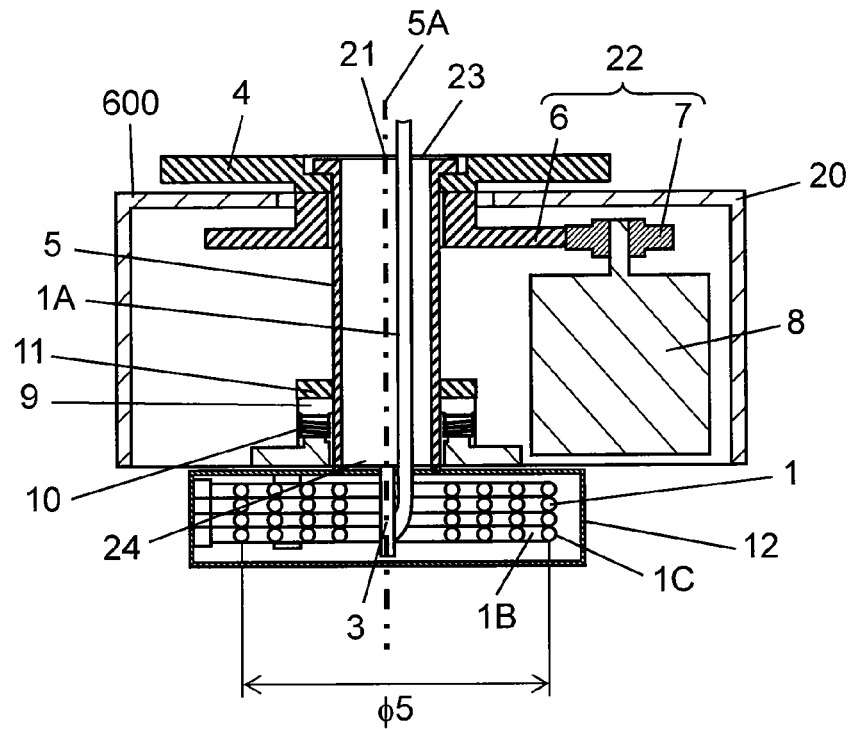
FIG. 2A is a sectional view of an essential part of the positioner according to the first exemplary embodiment of the present invention.
Figure 2B:
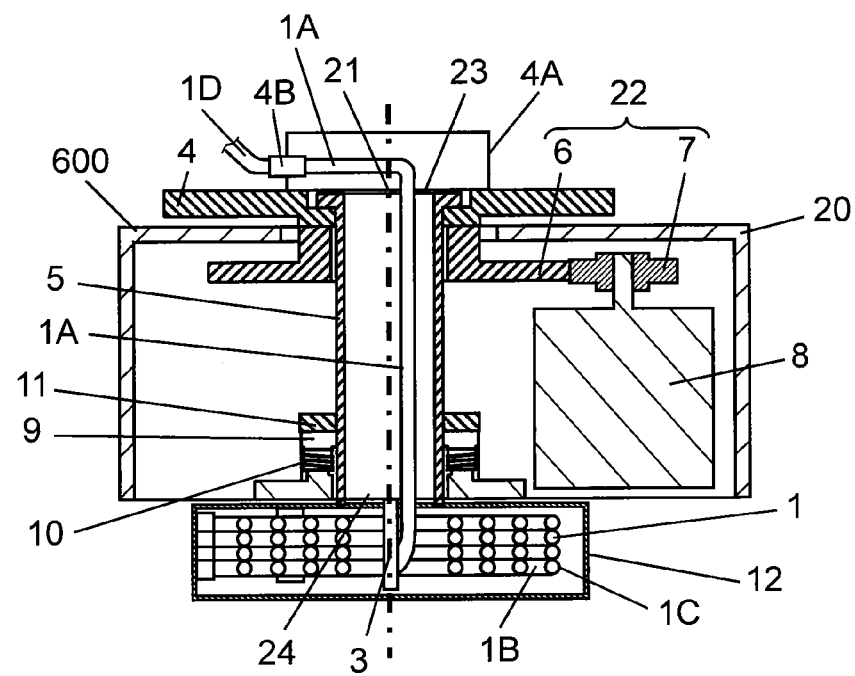
FIG. 2B is another sectional view of the essential part of the positioner according to the first exemplary embodiment of the present invention.

As shown in FIG. 2A, one end of first lead-out portion 1A is let out from housing 20 through cylinder 5 and table 4, and then connected to the jigs and other tools provided on table 4. Alternatively, when table 4 has cover 4A thereon as shown in FIG. 2B, one end of first lead-out portion 1A is connected to relay portion 4B, which is attached to cover 4A. First lead-out portion 1A is connected to curl cable 1D provided on table 4 via a relay portion 4B.

As a structure described above, one end of first lead-out portion 1A is connected to the jigs or cover 4A on table 4, and the other end of first lead-out portion 1A, that is, the other end of first wound portion 1B is fixed to fastener 3 by banding band 16. Case 12 is disposed opposite to table 4 with respect to cylinder 5.

Figure 5:
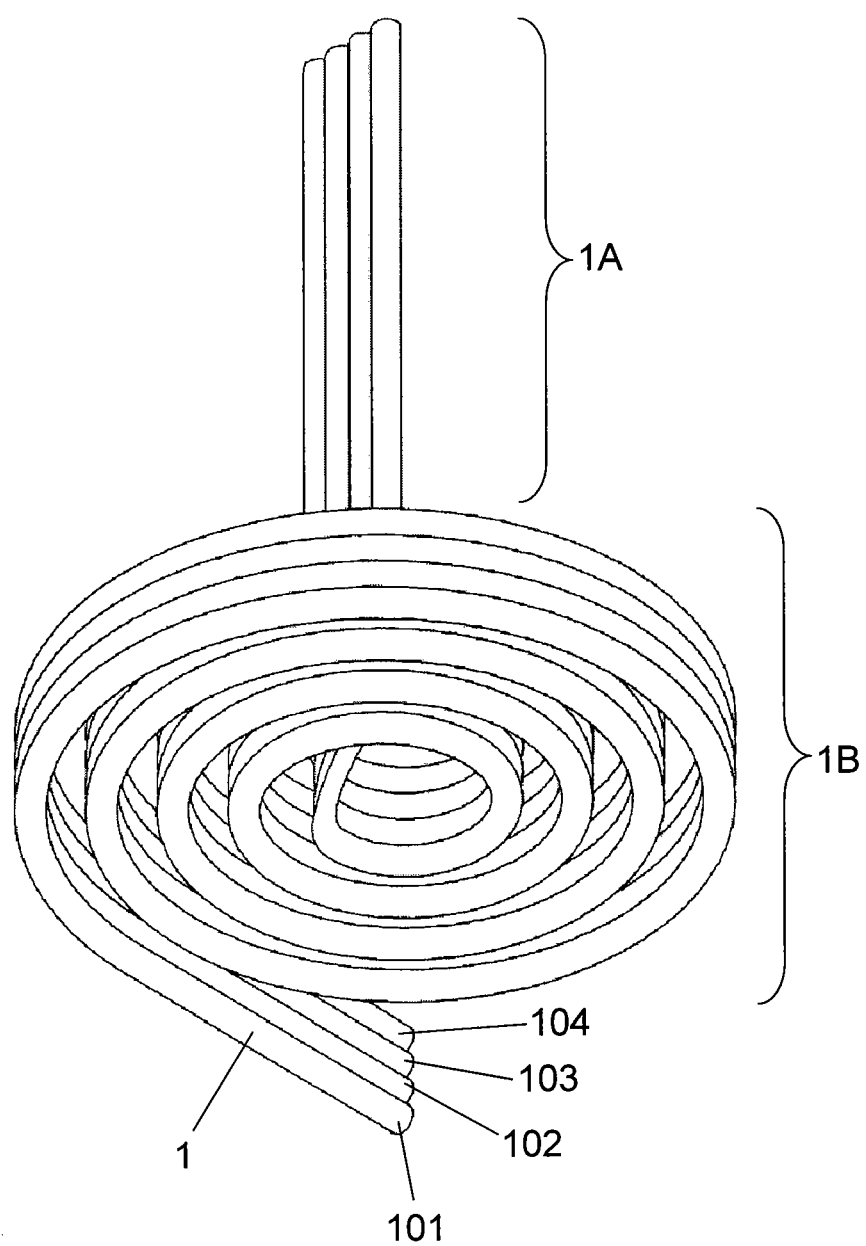
FIG. 5 is a perspective view of an essential part of a curl cable according to the first exemplary embodiment of the present invention.

As shown in FIG. 5, curl cable 1 includes wires and pipes, which are more specifically pipes for conveying a fluid and wires connected to the pipes. Alternatively, curl cable 1 may include interconnected pipes for conveying a fluid. In the present first exemplary embodiment, curl cable 1 includes interconnected wires. In FIG. 5, curl cable 1 includes wires 101 and 102 of the same type. For example, wires 101 and 102 are multicore wires. More specifically, wires 101 and 102 are polyurethane sheathed cables having an outer diameter of about φ7 mm. Similarly wires 103 and 104 are the same type such as multicore stranded wires with a braided shield. More specifically, wires 103 and 104 are polyurethane sheathed cables having an outer diameter of about φ8 mm. Due to the braided shield, wires 103 and 104 have a higher shielding effect than wires 101 and 102.

In curl cable 1 of the present first exemplary embodiment, wires 101, 102, 103, and 104 are combined so as to be in parallel. Wires 101, 102, 103, and 104 are welded or bonded each other. First wound portion 1B making up most part of curl cable 1 is heat treated and formed into a spiral. Whereas first lead-out portion 1A is not heat treated.

The positioner according to the present first exemplary embodiment thus structured operates as follows.

Motor 8 is driven by a control device. The power of motor 8 is transmitted to table 4 via reduction gear 22 including first and second gears 6 and 7 so as to rotate table 4. Cylinder 5 and fastener 3 rotate together with table 4. In the conventional positioner, the rotation of table 4 (corresponding to table 504 of FIG. 16) forms a "kink" in first lead-out portion 1A (corresponding to coiled portion 506 of FIG. 16). In the present first exemplary embodiment, on the other hand, because first lead-out portion 1A passing through the inside of cylinder 5 is fixed at both ends, first lead-out portion 1A rotates together with fastener 3. The force that used to form a "kink" acts on first wound portion 1B so as to either wind or unwind first wound portion 1B. This changes the diameter φ5 of first reel portion 1C. The rotation angle of table 4 is limited to the range in which first wound portion 1B is wound or unwound, that is, to the so-called range of variation. In the present first exemplary embodiment, the rotation angle of table 4 is limited to ±360° based on the range of variation of first wound portion 1B. The details will be described with reference to drawings.

Figure 6:
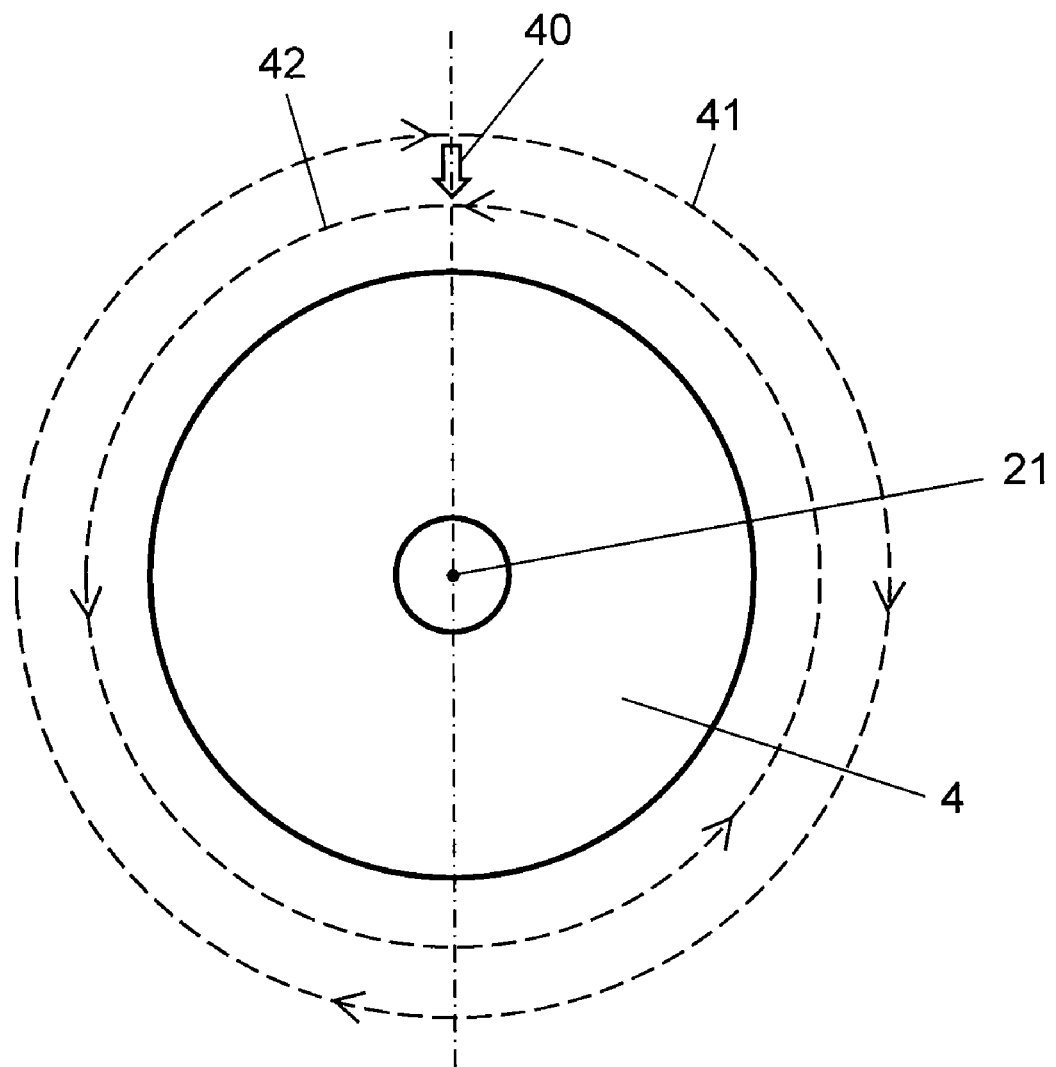
FIG. 6 is a diagram showing the operation of a table according to the first exemplary embodiment of the present invention.
Figure 7C:
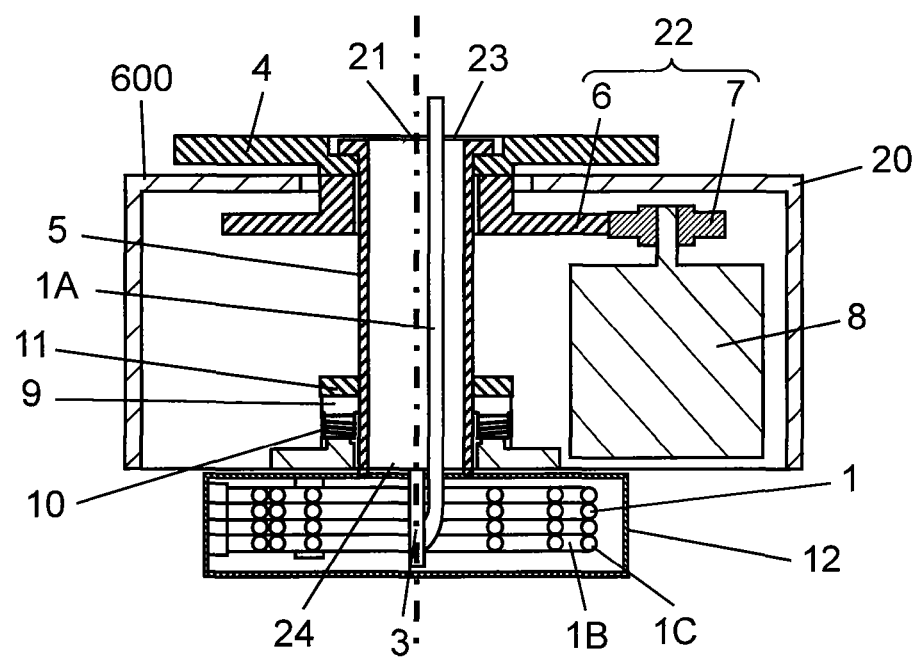
FIG. 7C is another sectional view of the essential part of the positioner according to the first exemplary embodiment of the present invention.
Figure 8A:
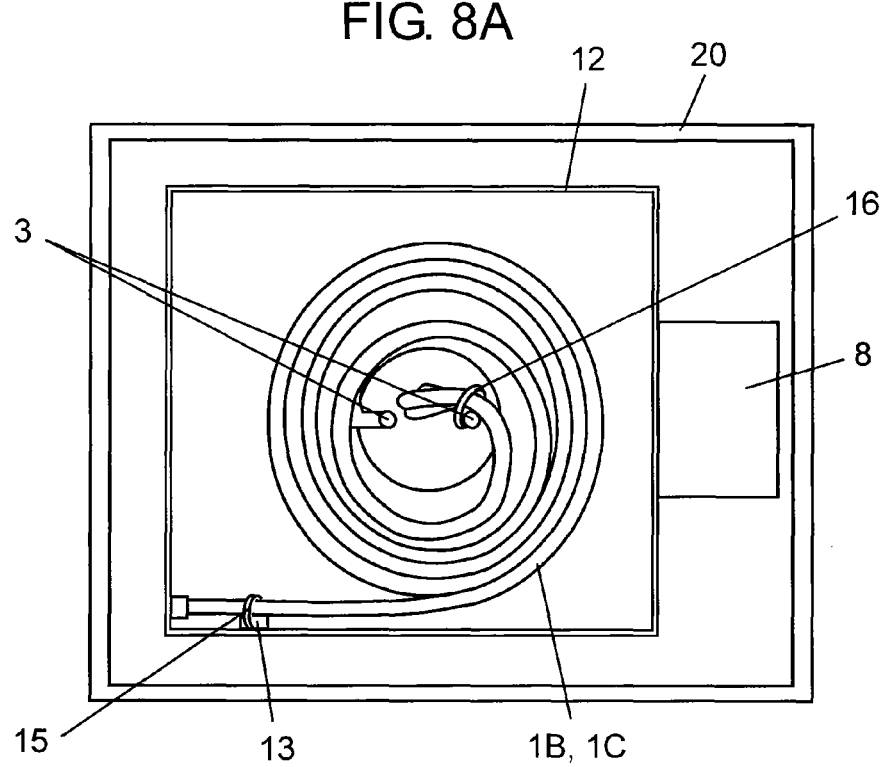
FIG. 8A is a bottom view of the essential part of the positioner according to the first exemplary embodiment of the present invention.

In FIG. 6, reference position 40 indicates the position from which the rotation angle of table 4 is measured. When table 4 is in this position, the wound state of first wound portion 1B housed in case 12 is shown in FIGS. 7A and 8A.

Figure 8B:
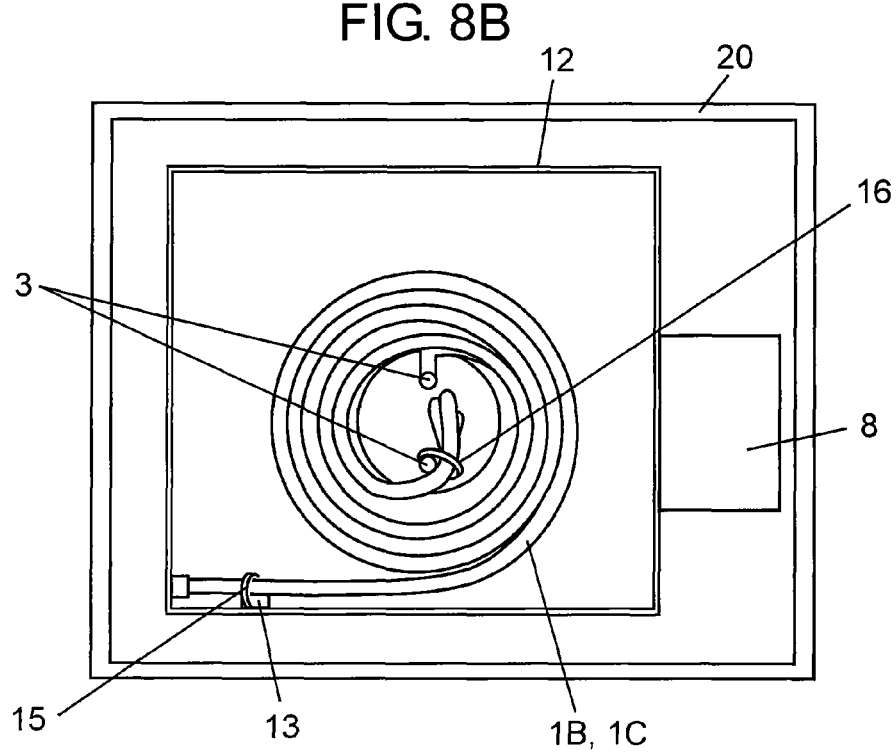
FIG. 8B is another bottom view of the essential part of the positioner according to the first exemplary embodiment of the present invention.

In FIG. 6, arrow 41 indicates a forward direction in which table 4 can rotate 360° in the clockwise direction from reference position 40. The maximum rotation angle in the forward direction is shown as +360°. To make table 4 rotate to the angle of +360°, first wound portion 1B needs to be fully wound. More specifically, when first wound portion 1B is fully wound around fastener 3, the diameter φ5 of first reel portion 1C becomes minimum. When table 4 is in the maximum rotation angle in the forward direction, the wound state of first wound portion 1B housed in case 12 is shown in FIGS. 7B and 8B.

Figure 8C:
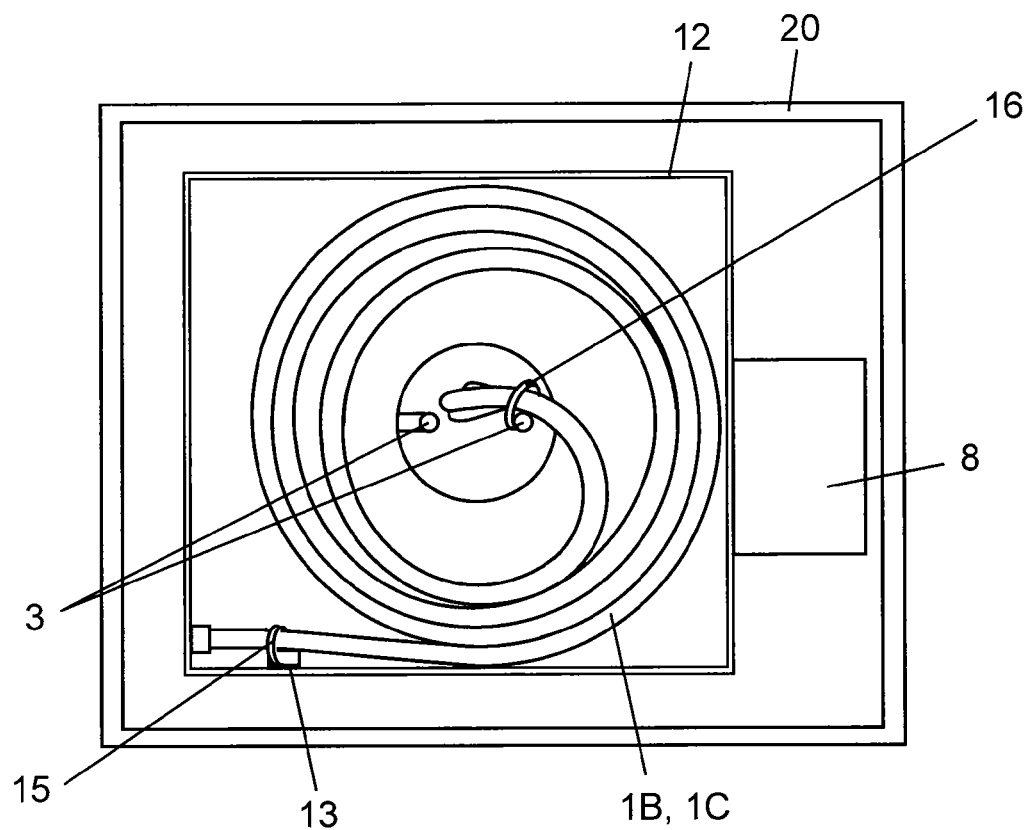
FIG. 8C is another bottom view of the essential part of the positioner according to the first exemplary embodiment of the present invention.

In FIG. 6, arrow 42 indicates a reverse direction in which table 4 can rotate 360° in the counterclockwise direction from reference position 40. The maximum rotation angle in the reverse direction is shown as −360°. To make table 4 rotate to the angle of −360°, first wound portion 1B needs to be fully unwound. More specifically, when first wound portion 1B is fully unwound in case 12, the diameter (φ5 of first reel portion 1C becomes maximum. The wound state of first wound portion 1B housed in case 12 when table 4 is in the maximum rotation angle in the reverse direction is shown in FIGS. 7C and 8C.

The above-described operation can be performed smoothly when first lead-out portion 1A is fixed at both ends thereof. More specifically, one end of first lead-out portion 1A is connected to the jigs or cover 4A on table 4, and the other end is fixed by banding band 16 to fastener 3 provided opposite to table 4 with respect to cylinder 5. When first lead-out portion 1A is fixed at both ends, first lead-out portion 1A rotates together with cylinder 5 without causing a kink.

Figure 16:
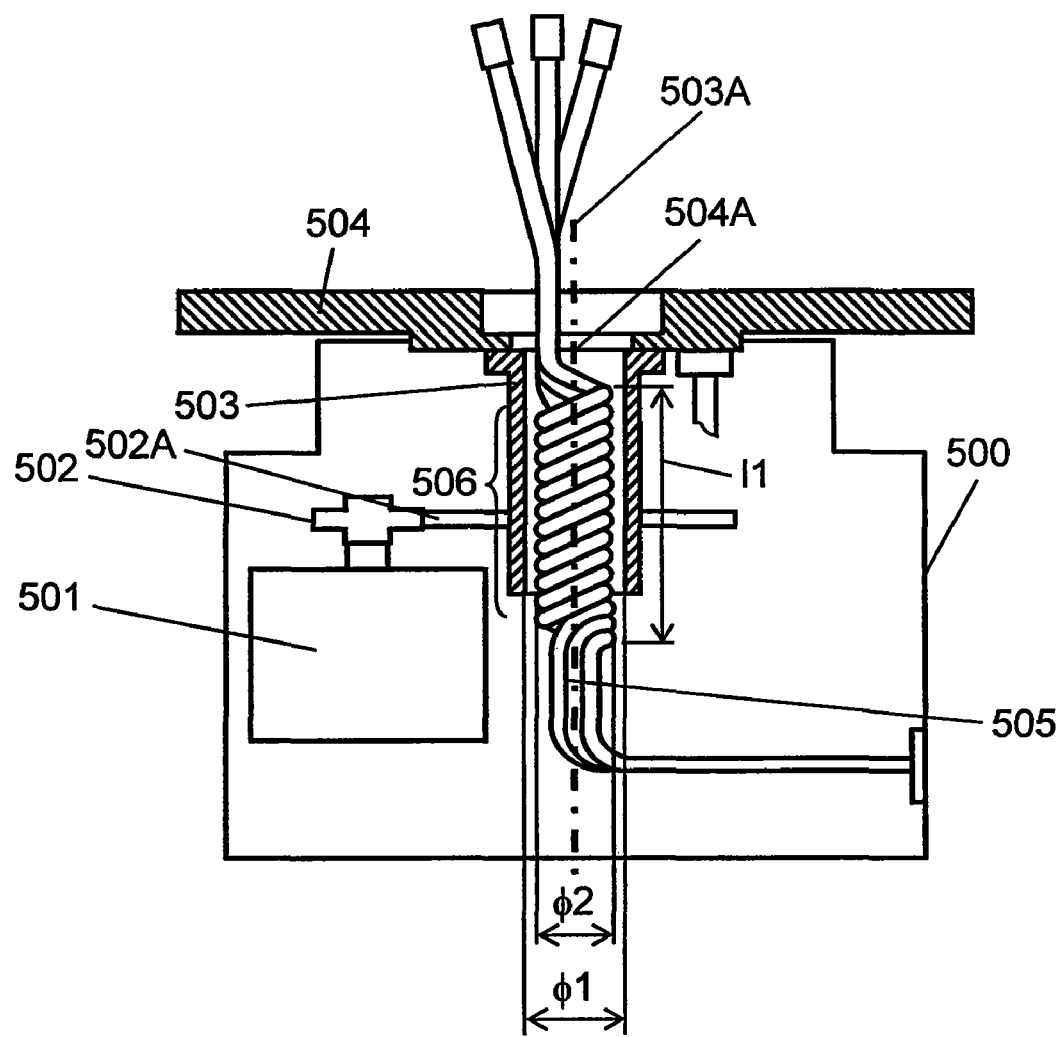
FIG. 16 is a sectional view of an essential part of a conventional positioner.

In the conventional positioner, as shown in FIG. 16, cylinder 503 has an inner diameter of φ1, and the coiled portion of composite curl cord 505 has an outer diameter of φ2, indicating that the distance between diameters φ1 and φ2 is not large enough. As a result, the rotation of table 504 forms a kink in coiled portion 506 of composite curl cord 505, causing coiled portion 506 to be trapped in cylinder 503.

First lead-out portion 1A, on the other hand, is positioned in the vicinity of openings 23 and 24 with respect to cylinder 5 as described above. Hence, first lead-out portion 1A rotates with cylinder 5 while remaining in the same position with respect to cylinder 5. The rotation of table 4 allows the force that used to form a kink in first lead-out portion 1A to act on first wound portion 1B, and either to wind or to unwind first wound portion 1B. As a result, the rotation angle of table 4 is adjusted in the range of variation of first wound portion 1B which is wound or unwound in case 12.

With this structure, even in the case of using curl cable 1 composed of a large number of wires and pipes, positioner 600 can function as long as fastener 3 provided outside cylinder 5 can wind and unwind first wound portion 1B. Thus, unlike the conventional positioner, positioner 600 according to the present first exemplary embodiment allows the use of a large number of wires and pipes without increasing its size.

In positioner 600 according to the present first exemplary embodiment, the rotation range of table 4 can be adjusted by the length of first wound portion 1B provided outside cylinder 5. Thus, the rotation range of table 4 can be controlled by the length of first wound portion 1B which is wound around or unwound from fastener 3.

Putting first lead-out portion 1A inside cylinder 5 allows the number of wires and pipes composing curl cable 1 to be increased or decreased without changing the inner diameter of cylinder 5. As a result, cylinder 5 and reduction gear 22 connected thereto can be used regardless of the number of wires and pipes composing curl cable 1. This reduces inventory of components for the production of positioner 600 and components for the repair of sold positioner 600.

The IO (input and output) signals, the power supply, and the like are supplied to the jigs and other tools provided on table 4 via curl cable 1. Curl cable 1 is wound around or unwound from fixed shafts 302 on fastener 3 according to the direction of rotation of table 4. In other words, the rotation angle of table 4 changes depending on the number of turns of first wound portion 1B wound around fixed shafts 302. The change in the number of turns bends curl cable 1 only a little. As a result, curl cable 1 receives minimum damage and, thus the degradation of curl cable 1 cab be suppressed. This curl cable 1 can provide a long-term stable supply of IO (input and output) signals, the power supply, and the like.

Figure 9:
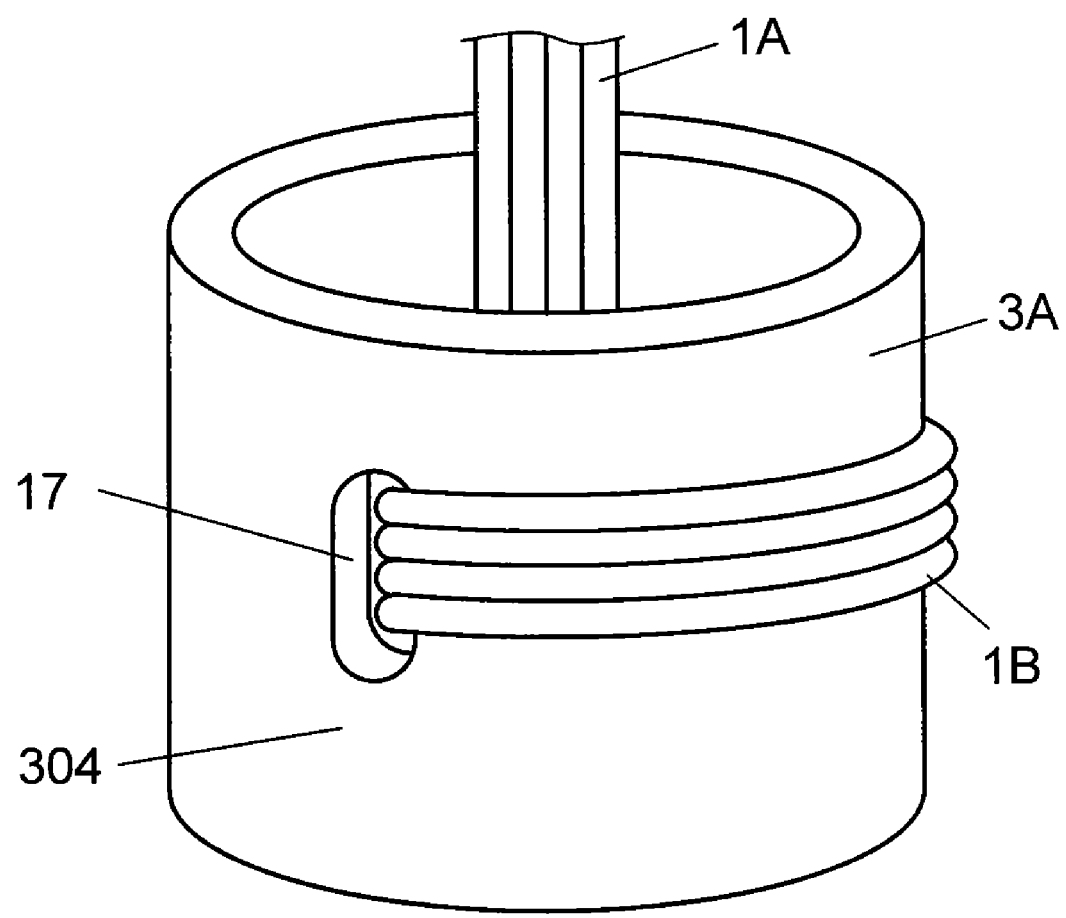
FIG. 9 is a perspective view of another fastener according to the first exemplary embodiment of the present invention.

In the above description, fastener 3 has two fixed shafts 302 shown in FIG. 3. Alternatively, it is possible to use fastener 3A having wall surface 304 shown in FIG. 9. In this case, first wound portion 1B is held by hole 17, which plays a role of banding band 16 as the first holder.

Curl cable 1 is a combination of wires in the above description of the present first exemplary embodiment, but may alternatively be a combination of wires and tubes or a combination of tubes to obtain the same effect.

Thus, according to the present first exemplary embodiment, curl cable 1 can be properly selected so as to be provided. This eliminates the need to provide extra wires and pipes.

Second Exemplary Embodiment

Another embodiment of the present invention will be described as follows with reference to FIGS. 10 to 15. Like components are labeled with like reference numerals with respect to the first exemplary embodiment, and hence the description thereof will be omitted.

Figure 10:
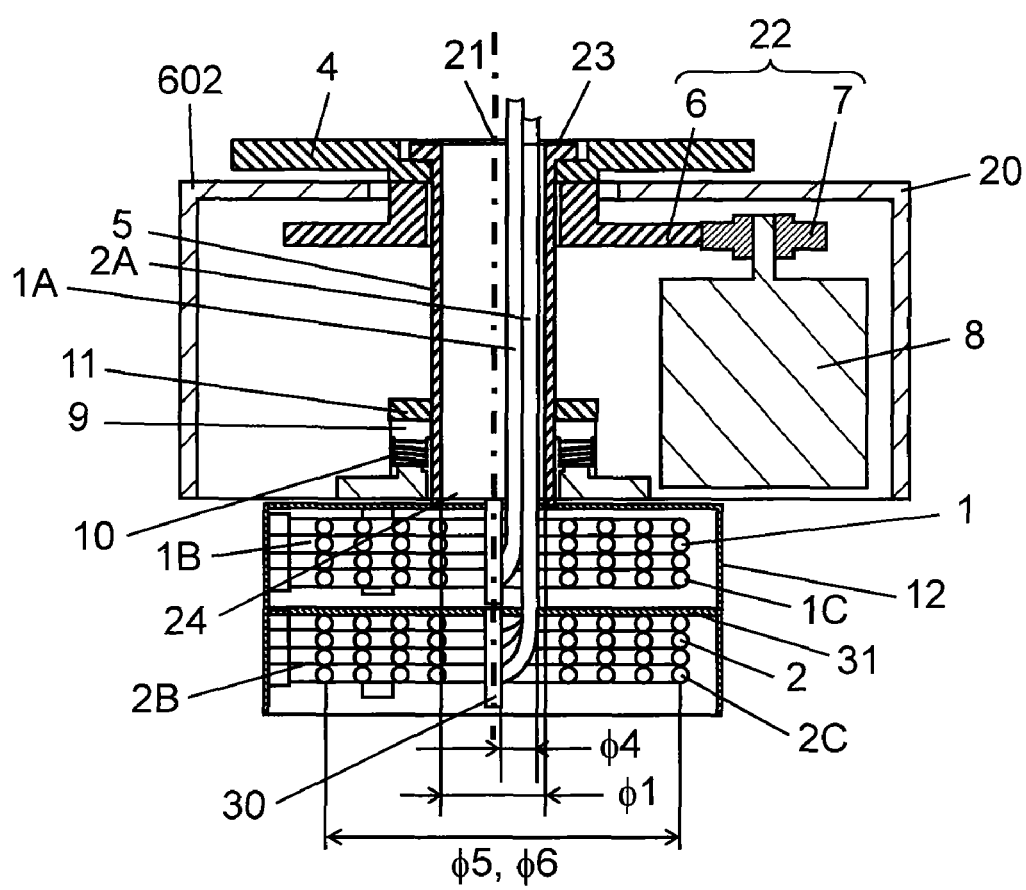
FIG. 10 is a sectional view of an essential part of a positioner according to a second exemplary embodiment of the present invention.
Figure 11:
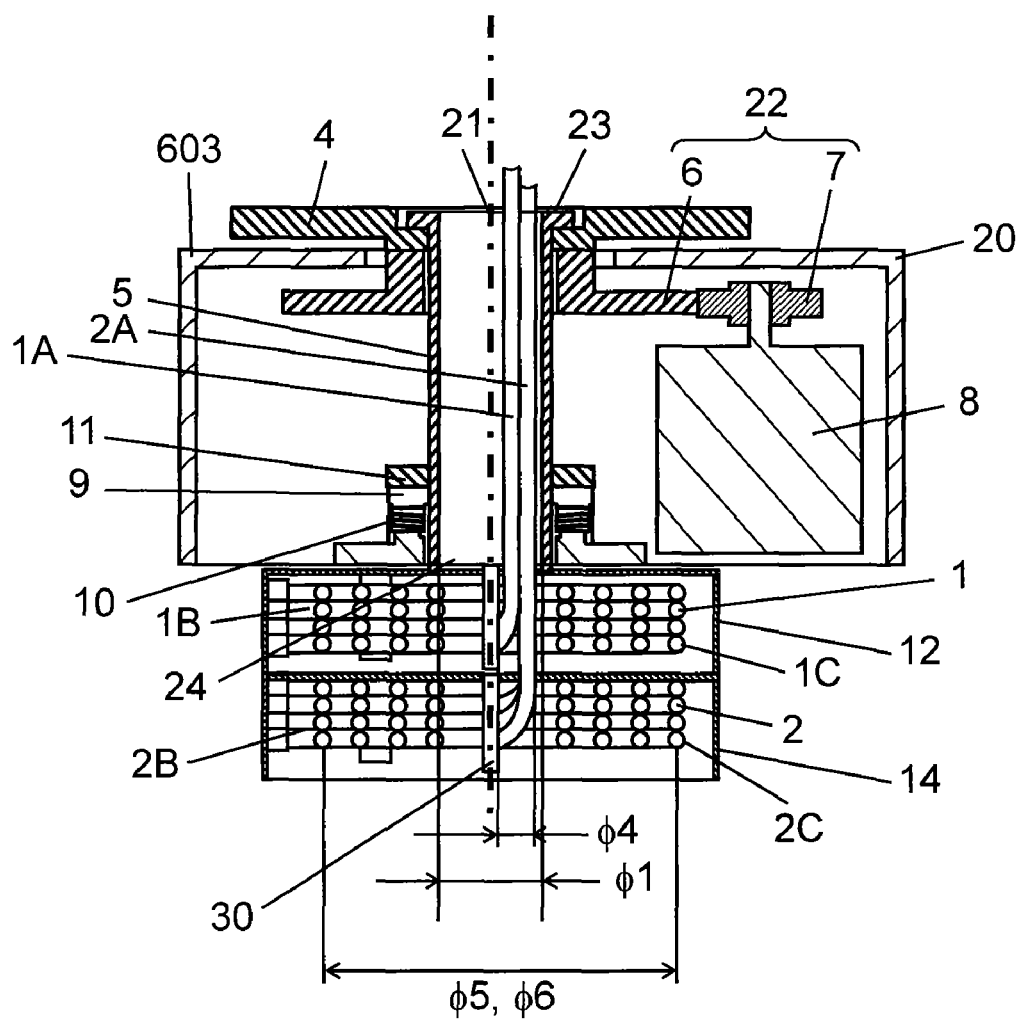
FIG. 11 is a sectional view of an essential part of another positioner according to the second exemplary embodiment of the present invention.
Figure 12:
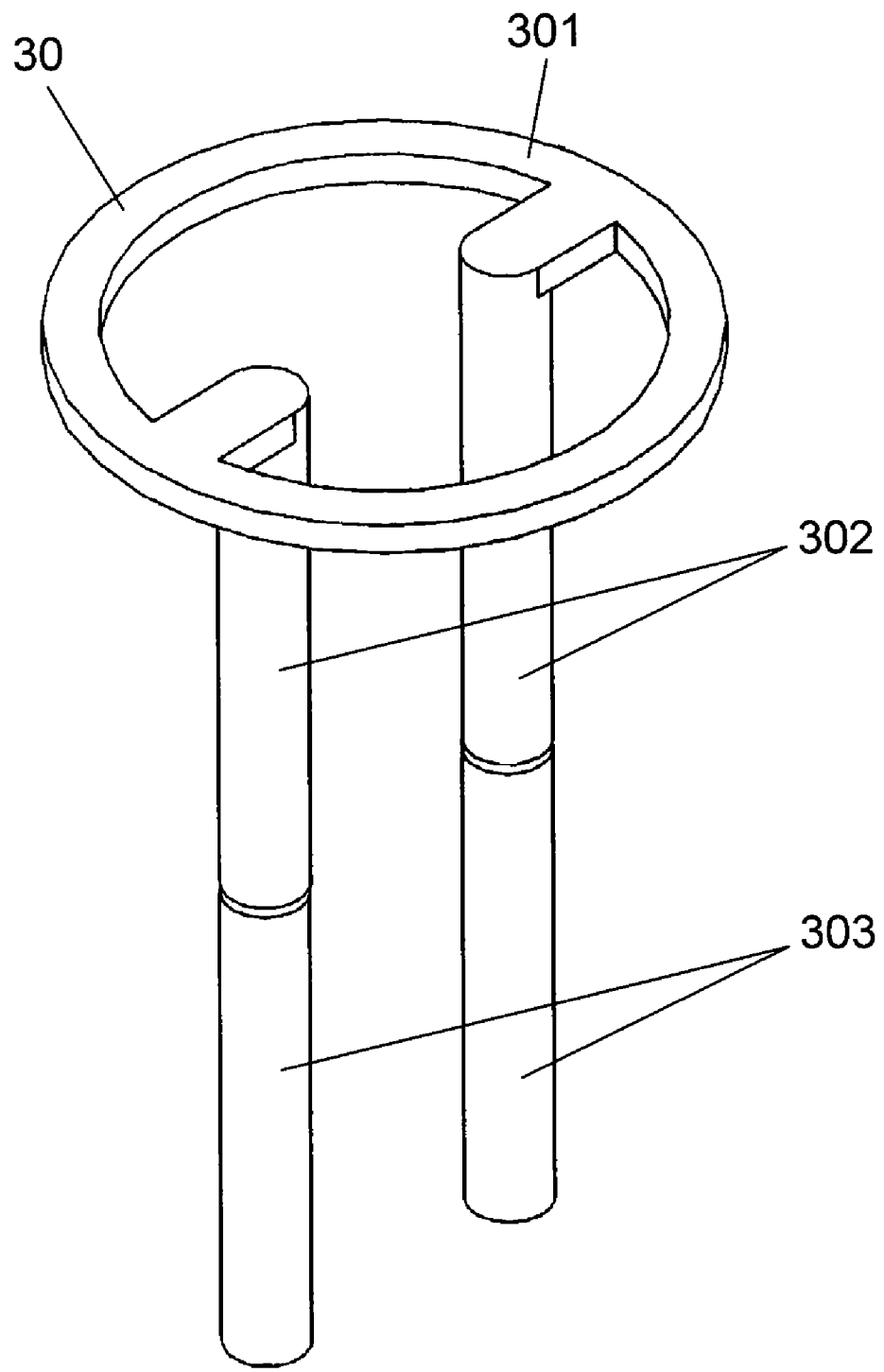
FIG. 12 is a perspective view of a fastener according to the second exemplary embodiment of the present invention.

FIG. 10 is a sectional view of a positioner according to the second exemplary embodiment of the present invention. FIG. 11 is a sectional view of another positioner according to the second exemplary embodiment. FIG. 12 is a perspective view of a fastener according to the second exemplary embodiment.

Positioners 602 and 603 of the present second exemplary embodiment differ from positioner 600 of the first exemplary embodiment in having fixed shafts 303 as a second winder and curl tube 2 as a second cord.

In positioner 602 of FIG. 10, case 12 includes partition board 31 inside case 12. Partition board 31 separates first wound portion 1B wound around fixed shafts 302 from second wound portion 2B wound around fixed shafts 303.

Positioner 603 of FIG. 11 further includes, below case 12, case 14 as a second case. Second wound portion 2B is housed inside case 14. Case 14 is detachable from case 12.

As shown in FIG. 12, fastener 30 includes fixed plate 301, fixed shafts 302, and fixed shafts 303 as a second winder. In fastener 30, fixed shafts 303 are further from cylinder 5 than fixed shafts 302, which are also used in fastener 3 of the first exemplary embodiment. Fixed shafts 303 can be attached to fixed shafts 302 detachably using bolts.

Curl tube 2 includes second lead-out portion 2A and second wound portion 2B. Second lead-out portion 2A enters opening 24, passes through cylinder 5, and is led out from table 4. Second wound portion 2B is wound around fixed shafts 303 so as to form second reel portion 2C. Second reel portion 2C changes its diameter φ6 with the rotation of table 4. Second lead-out portion 2A corresponds to the portion of curl tube 2 excluding second wound portion 2B.

Fastener 30 is wound with curl cable 1 and curl tube 2. Fixed shafts 302 are wound with first wound portion 1B. First wound portion 1B is fixed at one end to either one of fixed shafts 302 by a banding band. Fixed shafts 303 are wound with second wound portion 2B. Second wound portion 2B is fixed at one end to either one of fixed shafts 303 by a banding band.

One end of first lead-out portion 1A and one end of second lead-out portion 2A enter opening 24, pass through cylinder 5, are led out from table 4. One end of first lead-out portion 1A and one end of second lead-out portion 2A are connected to the jigs or the cover on table 4. The other end of first lead-out portion 1A and the other end of second lead-out portion 2A are fixed to fastener 30 provided opposite to table 4 with respect to cylinder 5 by banding band 16A as a second holder. When fixed at both ends, first and second lead-out portions 1A and 2A rotate together with cylinder 5 without causing a kink.

As shown in FIG. 13, second wound portion 2B is housed in case 12. In the present second exemplary embodiment, second reel portion 2C formed by second wound portion 2B is a spiral around fastener 30 and housed in case 12. Case 12 is provided with installation portion 32, which is disposed on an inner wall surface of case 12 in such a manner as to form a projection projecting toward the inside of case 12. Second wound portion 2B is fixed to installation portion 32 at one end by banding band 15A, and to fastener 30 at the other end by banding band 16A, which is the second holder.

As shown in FIG. 10, one end of first lead-out portion 1A of curl cable 1 and one end of second lead-out portion 2A of curl tube 2 are let out from housing 20 through cylinder 5 and table 4, and then connected to the jigs and other tools provided on table 4.

As described above, one end of first lead-out portion 1A and one end of second lead-out portion 2A of curl tube 2 are connected to the jigs and other tools on table 4. The other end of first lead-out portion 1A and the other end of second lead-out portion 2A are fixed to fastener 30 by banding bands 16 and 16A, respectively. Case 12 is disposed opposite to table 4 with respect to cylinder 5.

As shown in FIG. 14, similarly, second wound portion 2B is housed in case 14. In the present second exemplary embodiment, second reel portion 2C formed by second wound portion 2B is spiral-shaped around fastener 30 and is housed in case 14. Case 14 is provided with installation portion 32, which is attached on an inner wall surface of case 14 in such a manner as to form a projection projecting toward the inside of case 14. Second wound portion 2B is fixed to installation portion 32 at one end by banding band 15A, and to fastener 30 at the other end by banding band 16A, which is the second holder.

As shown in FIG. 11, one end of first lead-out portion 1A of curl cable 1 and one end of second lead-out portion 2A of curl tube 2 are let out from housing 20 through cylinder 5 and table 4, and then connected to the jigs and other tools provided on table 4.

As described above, one end of first lead-out portion 1A and one end of second lead-out portion 2A of curl tube 2 are connected to the jigs and other tools on table 4. The other end of first lead-out portion 1A and the other end of second lead-out portion 2A are fixed to fastener 30 by banding bands 16 and 16A, respectively. Case 14 is disposed opposite to table 4 with respect to cylinder 5.

Figure 15:
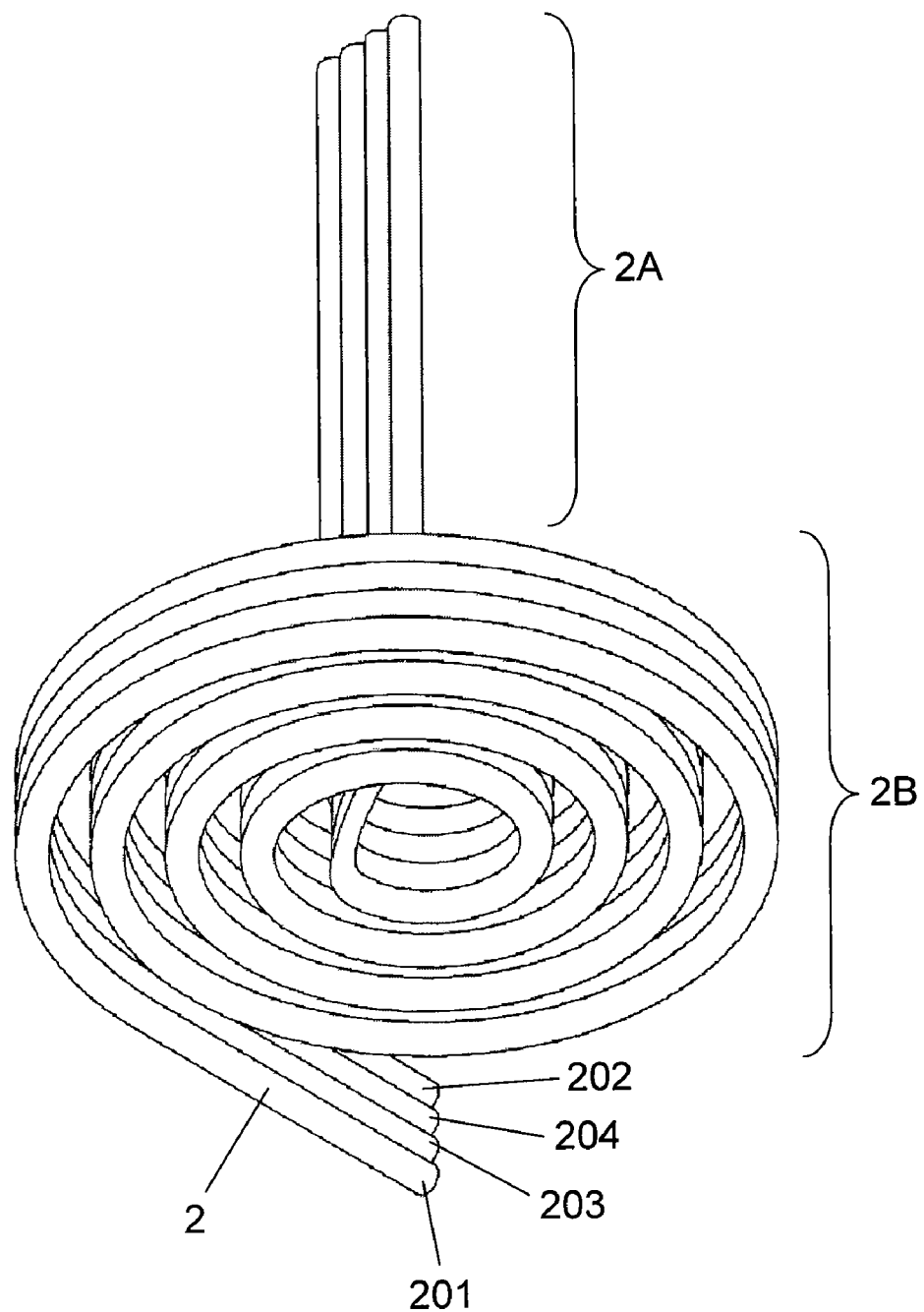
FIG. 15 is a perspective view of an essential part of a curl tube according to the second exemplary embodiment of the present invention.

As shown in FIG. 15, curl tube 2 includes wires and pipes, which are more specifically pipes for conveying a fluid, and wires connected to the pipes. Alternatively, curl tube 2 may include interconnected pipes for conveying a fluid. In the present second exemplary embodiment, curl tube 2 includes interconnected pipes. In FIG. 15, pipes 201 and 202 of the same type are used. More specifically, pipes 201 and 202 are polyurethane sheathed polyurethane tubes having an outer diameter of about $\phi 9$ mm, and supplying the jigs provided on table 4 with air or another type of gas. Curl tube 2 further includes pipes 203 and 204 of the same type. More specifically, pipes 203 and 204 are polyurethane sheathed polyolefin tubes having an outer diameter of about $\phi 9$ mm, and supplying the jigs provided on table 4 with air or another type of gas. Alternatively, pipes 203 and 204 may supply the jigs provided on table 4 with a liquid such as cooling water.

In curl tube 2 of the present second exemplary embodiment, pipes 201, 202, 203, and 204 are combined so as to be in parallel. Pipes 201, 202, 203, and 204 are welded or bonded to each other. Second wound portion 2B making up most of curl tube 2 is heat treated and formed into a spiral, whereas second lead-out portion 2A is not heat treated.

The fundamental operation of the positioners thus structured is the same as that of the positioner of the first exemplary embodiment, and hence, the description thereof will be omitted.

The following is a description of the features of the present second exemplary embodiment. As shown in FIGS. 10 and 11, cylinder 5 of positioners 602 and 603 accommodates double the number of wires and pipes than in the first exemplary embodiment. More specifically, curl cable 1 and curl tube 2 shown in FIGS. 5 and 15, respectively, pass through cylinder 5 in parallel. First and second lead-out portions 1A and 2A have a total outer diameter of $\phi 4$, and the cylinder 5 has an inner diameter of $\phi 1$. In positioners 602 and 603 according to the present second exemplary embodiment, the distance between $\phi 1$ and $\phi 4$ is large enough to dispose easily first and second lead-out portions 1A and 2A, comparing to the conventional positioner of FIG. 16.

Since each of first and second lead-out portions 1A and 2A is fixed at both ends, first and second lead-out portions 1A and 2A passing through the inside of cylinder 5 rotate together with fastener 30. The force that used to form a "kink" acts on first and second wound portions 1B and 2B so as to either wind or unwind these portions 1B and 2B. Thus, this changes the diameters $\phi 5$ and $\phi 6$ of first and second reel portions 1C and 2C, respectively. The rotation angle of table 4 is limited to the range in which first and second wound portions 1B and 2B are wound or unwound, that is, to the so-called range of variation.

In the present second exemplary embodiment, as shown in FIG. 10, case 12 includes partition board 31 to separate first wound portion 1B wound around fixed shafts 302 from second wound portion 2B wound around fixed shafts 303. This structure allows first and second wound portions 1B and 2B to be wound around or unwound from fastener 30 without mixing with each other during the rotation of table 4, thus stabilizing the operation of positioner 602.

In the other positioner according to the present second exemplary embodiment shown in FIG. 11, fixed shafts 303 of fastener 30 and case 14 are detachable. The number of curl tubes 2 is increased or decreased based on the usage state of table 4. Thus, positioner 603 can increase or decrease the number of curl tubes 2 according to the usage state of table 4 regardless of the initial state.

Positioners 602 and 603 include brush 9 as shown in FIGS. 10 and 11 so as to supply welding current to a workpiece placed on table 4. Brush 9 is in constant contact with slip ring 11 by spring 10 so as to supply welding current to table 4 via cylinder 5. The action of brush 9 and slip ring 11 allows the welding current to be continuously supplied to table 4 even when table 4 is rotating.

As described hereinbefore, in the present second exemplary embodiment, curl cable 1 and curl tube 2 can be properly selected. Note that the present invention is not limited to the first and second exemplary embodiments. For example, the number of pairs of curl cable 1 and curl tube 2 is not limited to one or two.

The cable sheath material of the wires used for curl cable 1 may be PCV or the like instead of polyurethane. Curl cable 1 may be composed of pipes such as air tubes. The joining of the wires and pipes composing curl cable 1 is not limited to welding and bonding.

The material of the pipes used for curl tube 2 may be nylon or the like instead of polyurethane or polyolefin. The sheath material of curl tube 2 may be PCV or the like instead of polyurethane. Part of the pipes composing curl tube 2 may be replaced by multicore wires. The joining of these pipes is not limited to welding and bonding.

The positioner may have one or more legs. Fasteners 3 and 30 including fixed shafts 302 and 303 may further include third- or higher-staged fixed shafts.

The number of pairs of curl cable 1 and curl tube 2 can be two or more in which case it is possible to increase the number of partition boards 31 in case 12 or the number of cases 14 when necessary.

INDUSTRIAL APPLICABILITY

The positioner according to the present invention can increase the number of air tubes or wires to be led out onto the table without increasing its size, thereby being suitable for processing such as welding or cutting using an industrial robot.

REFERENCE MARKS IN THE DRAWINGS 1 curl cable (first cord)
1A first lead-out portion
1B first wound portion
2 curl tube (second cord)
2A second lead-out portion
2B second wound portion
3 fastener (first winder)
4 table
5 cylinder
6 first gear
7 second gear
8 motor (drive portion)
12 case (first case)
13 installation portion
14 case (second case)
15 banding band
16 banding band (first holder)
16A banding band (second holder)
20 housing
21 rotation center
22 reduction gear
23 opening (first opening)
24 opening (second opening)
30 fastener
31 partition board
32 installation portion
101 wire
102 wire
103 wire
104 wire
201 tube (pipe)
202 tube (pipe)
203 tube (pipe)
204 tube (pipe)
301 fixed plate
302 fixed shaft (first winder shaft)
303 fixed shaft (second winder)
600 positioner
602 positioner
603 positioner

The invention claimed is:

1. A positioner comprising:
a housing;
a table rotating around a rotation center with respect to the housing;
a drive portion for rotating the table around the rotation center in forward and reverse directions;
a cylinder including:
a first opening at the rotation center of the table; and
a second opening opposite and connected to the first opening;
a first winder coupled to the second opening of the cylinder; and
a first cord including:
a first lead-out portion entering the second opening, passing through the cylinder, and being led out from the table; and
a first wound portion wound around the first winder according to a rotation of the table.

2. The positioner of claim 1, further comprising:
a first holder for holding the first cord onto the first winder.

3. The positioner of claim 1, wherein
the first winder includes a ring-shaped portion and a plurality of first winder shafts extending from the ring-shaped portion, the plurality of first winder shafts wound with the first wound portion.

4. The positioner of claim 1, further comprising:
a first case for housing the first wound portion.

5. The positioner of claim 4, further comprising:
a second winder further from the cylinder than the first winder; and
a second cord including:
a second lead-out portion entering the second opening, passing through the cylinder, and being led out from the table; and
a second wound portion wound around the second winder according to a rotation of the table, wherein
the first case includes a partition board for separating the first wound portion and the second wound portion.

6. The positioner of claim 5, further comprising:
a second holder for holding the second cord onto the second winder.

7. The positioner of claim 4, further comprising:
a second winder further from the cylinder than the first winder;
a second cord including:
a second lead-out portion entering the second opening, passing through the cylinder, and being lead out from the table; and
a second wound portion wound around the second winder according to a rotation of the table, and
a second case for housing the second wound portion.

8. The positioner of claim 7, further comprising:
a second holder for holding the second cord onto the second winder.

9. The positioner of claim 7, wherein the first case and the second case are detachable from each other.

10. The positioner of claim 1, wherein the first cord includes a pipe for conveying a fluid, and a wire connected to the pipe.

11. The positioner of claim 5, wherein each of the first cord and the second cord includes a pipe for conveying a fluid and a wire connected to the pipe.

12. The positioner of claim 1, wherein the first cord includes interconnected pipes for conveying a fluid.

13. The positioner of claim 5, wherein each of the first cord and the second cord includes interconnected pipes for conveying a fluid.

14. The positioner of claim 1, wherein the first cord includes interconnected wires.

15. The positioner of claim 5, wherein each of the first cord and the second cord includes interconnected wires.

16. The positioner of claim 1 wherein, the first lead-out portion passes through a central portion of the first winder.

* * * * *

UNITED STATES PATENT AND TRADEMARK OFFICE
CERTIFICATE OF CORRECTION

PATENT NO. : 8,376,339 B2  
APPLICATION NO. : 12/678385  
DATED : February 19, 2013  
INVENTOR(S) : Takashi Nagai et al.

Page 1 of 1

It is certified that error appears in the above-identified patent and that said Letters Patent is hereby corrected as shown below:

On Title Page 2

At Item (56) FOREIGN PATENT DOCUMENTS, delete duplicate entry "JP    2007-229904 A    9/2007".

Signed and Sealed this
Twenty-third Day of April, 2013

Teresa Stanek Rea
*Acting Director of the United States Patent and Trademark Office*